United States Patent
Bolus et al.

(10) Patent No.: US 9,876,429 B1
(45) Date of Patent: Jan. 23, 2018

(54) RECONFIGURABLE ON TIME CIRCUIT FOR CURRENT MODE CONTROL OF BUCK CONVERTER

(71) Applicant: Apple Inc., Cupertino, CA (US)

(72) Inventors: Jonathan F. Bolus, San Francisco, CA (US); Jitendra K. Agrawal, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/268,425

(22) Filed: Sep. 16, 2016

(51) Int. Cl.
*H02M 3/158* (2006.01)
*H02M 1/08* (2006.01)
*H02M 1/00* (2006.01)

(52) U.S. Cl.
CPC ............. *H02M 3/158* (2013.01); *H02M 1/08* (2013.01); *H02M 2001/0009* (2013.01)

(58) Field of Classification Search
CPC ........ H02M 1/08; H02M 3/156; H02M 3/158; H02M 2001/0009; H02M 2003/156; H02M 2003/158
See application file for complete search history.

(56) References Cited

U.S. PATENT DOCUMENTS

| | | | |
|---|---|---|---|
| 5,568,044 A * | 10/1996 | Bittner | H02M 3/156 323/224 |
| 7,439,720 B2 | 10/2008 | Nguyen | |
| 7,852,055 B2 * | 12/2010 | Michishita | H02M 3/156 323/282 |
| 8,193,793 B2 * | 6/2012 | Kumagai | H02M 3/156 323/282 |
| 8,253,397 B2 * | 8/2012 | Collins | H02M 3/156 323/271 |
| 8,541,994 B2 | 9/2013 | Huang | |
| 8,624,571 B2 | 1/2014 | da Silva | |
| 8,698,470 B2 | 4/2014 | Ju | |
| 2010/0320983 A1 * | 12/2010 | Wu | H02M 3/1584 323/283 |
| 2011/0241641 A1 * | 10/2011 | Chen | H02M 3/1588 323/284 |
| 2015/0061624 A1 * | 3/2015 | Lalithambika | H02M 3/156 323/282 |
| 2015/0214827 A1 * | 7/2015 | Yoon | H02M 3/1588 323/286 |
| 2015/0229212 A1 * | 8/2015 | Shiwaya | H02M 3/158 323/282 |

* cited by examiner

*Primary Examiner* — Matthew Nguyen
(74) *Attorney, Agent, or Firm* — Meyertons, Hood, Kivlin, Kowert & Goetzel, P.C.

(57) ABSTRACT

An apparatus including an inductor coupled to a load circuit, a control circuit, and a driver circuit. The control circuit may be configured to select a first operating mode in response to a determination that a value of current flowing through the inductor is greater than a threshold, and to otherwise select a second operating mode. In the first operating mode, the driver circuit may be configured to source current to the load circuit through the inductor for a first duration, based on a comparison of a supply voltage level to a voltage level across the load circuit. In the second operating mode, the driver circuit may be configured to source current to the load circuit through the inductor at a number of time points. At each time point the current may be sourced for a second duration that is based on an allowable peak current flowing through the inductor.

20 Claims, 10 Drawing Sheets

US 9,876,429 B1

RECONFIGURABLE ON TIME CIRCUIT FOR CURRENT MODE CONTROL OF BUCK CONVERTER

BACKGROUND

Technical Field

Embodiments described herein are related to the field of integrated circuit implementation, and more particularly to the implementation of buck converter circuits.

Description of the Related Art

Computing systems may include one or more systems-on-a-chip (SoC), each of which may integrate a number of different functions onto a single integrated circuit. With numerous functions included in a single integrated circuit, chip count may be kept low in mobile computing systems, such as tablets, for example, which may result in reduced assembly costs, and a smaller form factor for such mobile computing systems. Many functional blocks, such as memories, timers, serial ports, phase-locked loops (PLLs), analog-to-digital converters (ADCs) and more, may be included in an SoC. Various SoCs and/or various functional blocks on a given SoC may utilize power signals of different voltage levels. Since computing systems may include a single power source with a given output voltage level, one or more voltage converters or voltage regulators may be used to generate the power signals of different voltage levels.

Voltage regulating circuits implemented in a given computing system may select from among various types of voltage converting and voltage regulating circuits. Types of circuits for converting a DC power signal with a first voltage to a DC power signal with a second voltage include linear regulators and switching regulators. Buck converters, sometimes also referred to as buck regulators, are one example of a switching regulator.

SUMMARY OF THE EMBODIMENTS

Various embodiments of a voltage conversion apparatus are disclosed. Broadly speaking, an apparatus, a system, and a method are contemplated in which the apparatus includes an inductor coupled to a load circuit, a control circuit, and a driver circuit. The control circuit may be configured to select a first operating mode in response to a determination that a value of current flowing through the inductor is greater than a threshold value, and to otherwise select a second operating mode. In the first operating mode, the driver circuit may be configured to source current to the load circuit through the inductor for a first duration that is based on a comparison of a power supply voltage level to a voltage level across the load circuit. In the second operating mode, the driver circuit may be configured to source current to the load circuit through the inductor at a number of time points, wherein at each time point the current is sourced for a second duration that is based on an allowable peak current flowing through the inductor.

In a further embodiment, a length of the first duration and a length of the second duration may be determined by a time to charge a capacitor to a voltage level of a reference voltage. In another embodiment, the control circuit may be further configured to, in the first operating mode, set the reference voltage based on a voltage level across the load circuit.

In one embodiment, the apparatus may further comprise a digital-to-analog converter (DAC). The control circuit may be further configured to, in the second operating mode, select an output of the DAC as the reference voltage.

In a further embodiment, the control circuit may also be configured to adjust the allowable peak current by adjusting the output of the DAC. In one embodiment, the control circuit may be further configured to disable the DAC in the first operating mode. In another embodiment, in response to a power-on event, the control circuit may also be configured to select the second operating mode.

BRIEF DESCRIPTION OF THE DRAWINGS

The following detailed description makes reference to the accompanying drawings, which are now briefly described.

Figure 1:
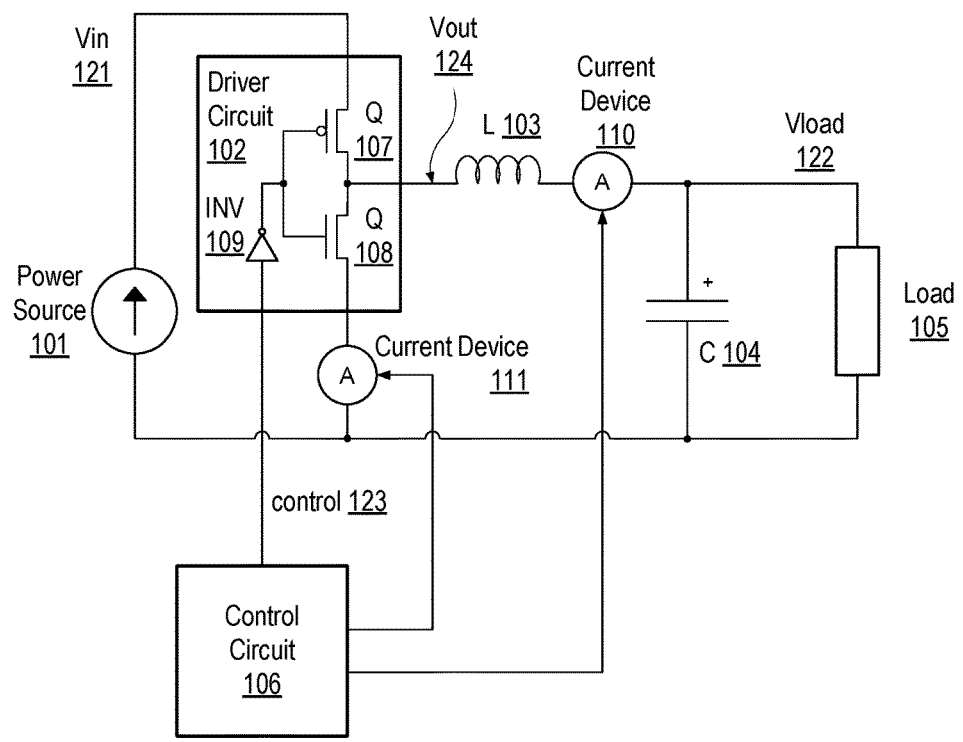
FIG. 1 illustrates a block diagram of an embodiment of a voltage converter.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Voltage conversion circuits may be found in many computing systems for providing a power supply signal of a particular voltage level to one or more integrated circuits (ICs) or to a subset of circuits in a given IC. Buck converters are one type of voltage conversion circuit that may be used to generate a power signal with a given voltage level. Buck converters receive an input power signal (Vin) and generate an output power signal (Vout) with a reduced voltage level. To reduce the voltage level of Vin to a desired voltage level on Vout, a buck converter may couple Vin to Vout for given periods of time via, for example, a switch or transistor.

The buck regulator may include a control circuit that generates a signal that enables and disables the transistor for the given amounts of time. Components such as, e.g., capacitors and inductors may be used to provide charge storage during the time periods in which the transistor is off. The voltage level of Vout may be dependent upon an average amount of time that the transistor is on versus off, referred to as the "on time," or "Ton." Pulse width modulation (PWM) is one method for generating the Ton signal enabling the transistor. This method works well when current demand of a load coupled to Vout is high. PWM control, however, may not meet an efficiency goal of the computing system when the current demand from the load is low. Pulse Frequency Modulation (PFM) is another method for generating the Ton signal which may provide better efficiency than PWM control when current demand from the load is low. PFM control, however, may not be as capable of supplying power when the current demand is high.

Various embodiments of voltage conversion circuits are described in this disclosure. The embodiments illustrated in the drawings and described below may provide techniques for converting a power signal within a computing system to a given voltage level when current demand on the power signal fluctuates between high and low levels.

The embodiments illustrated and described herein may employ CMOS circuits. In various other embodiments, however, other suitable technologies may be employed.

Some terms commonly used in reference to SoC designs and CMOS circuits are used in this disclosure. For the sake of clarity, it is noted that "high" or "high logic level" refers to a voltage sufficiently large to turn on a n-channel metal-oxide semiconductor field-effect transistor (MOSFET) and turn off a p-channel MOSFET while "low" or "low logic level" refers to a voltage that is sufficiently small enough to do the opposite. In other embodiments, different technology may result in different voltage levels for "low" and "high."

A block diagram of an embodiment of a voltage converter is shown in FIG. 1. In the illustrated embodiment, Voltage Converter 100 includes Power Source 101 coupled to Driver Circuit 102, which is, in turn, coupled to Inductor (L) 103. L 103 is further coupled to Capacitor (C) 104 and Load 105. Control Circuit 106 is coupled to Driver Circuit 102 as well as to Current Measurement Devices (Current Devices) 110 and 111. Driver Circuit 102 includes Transistors (Q) 107 and 108, and inverting circuit (INV) 109. Power signal Vin 121 is generated by Power Source 101 and Power signal Vload 122 is provided to Load 105. In various embodiments, Voltage Converter 100 may be configured for use in various computing applications such as, e.g., desktop computers, laptop computers, tablet computers, smartphones, or wearable devices.

Power Source 101 may correspond to any suitable power supply, such as, for example, a DC power supply, one or more batteries, a battery charger, or a voltage regulation circuit. Power Source 101, in the illustrated embodiment, generates power supply signal Vin 121 at a first voltage level. Multiple circuits may be coupled to Power Source 101 to receive Vin 121. Some circuits may use a power supply signal with a lower voltage level than the voltage level of Vin 121. Such circuits may, instead receive Vout from Voltage Converter 100.

Driver Circuit 102, in the illustrated embodiment, receives Vin 121 as well as control signal 123 from Control Circuit 106. Based on control signal 123, Driver Circuit 102 alternately enables Q 107 or Q 108. Q 107 may be referred to as a high-side driver since it couples L 103 to Vin 121, thereby increasing a voltage level of Vout 124. In contrast, Q 108 may be referred to as a low-side driver, coupling L 103 to a ground signal, and as a result, reducing the voltage level of Vout 124. By alternating between high-side driver Q 107 and low-side driver Q 108, a given voltage level between Vin 121 and the ground signal may be generated on Vout 124. A given time period in which Q 107 is enabled, is referred to herein as an "on time" or "Ton," during which current is sourced to Load 105 through L 103, while a given time period for Q 108 to be enabled is referred to as an "off time" or "Toff," during which current removed from Load 105 through L 103. A ratio of Ton to Toff may determine the voltage level of Vout 124. Control Circuit 106 generates control signal 123 to control Ton and Toff to adjust Vout 124 to a particular voltage level.

Inductor L 103 corresponds to any suitable type of inductive device. L 103 may, in some embodiments, correspond to a discrete component, such as, for example, a wire coiled around a magnetic core, or a magnetic film wrapped around a length of wire. A discrete L 103 may be coupled to Driver Circuit 102 via, bond pads, terminals, or input/output pins. In other embodiments, L 103 may be fabricated on a same IC as Driver Circuit 102.

Load 105 receives Vload 122, in the illustrated embodiment, as a power supply signal. Load 105 may correspond to any active or passive circuit, including, but not limited to, a processor, a system-on-a-chip (SoC), an RF transceiver, or a sensor (e.g., light sensor, touch sensor, gyroscopic sensor, temperature sensor, and the like). At any given time, Load 105 may consume one of a wide variety of currents, depending on a current state of operation. If, for example, Load 105 corresponds to an SoC, then Load 105 may consume a small amount of current while in a reduced power state and a much larger amount of current when in a fully operational state. During a Ton time period, C 104 may charge if the current demand from Load 105 is less than a current passing through L 103. In contrast, if Load 105 is drawing more current than is flowing through L 103, then the additional current may be provided by C 104.

Control Circuit 106 receives indications of amounts of current flowing through L 103 from Current Device 110 and through Q 108 from Current Device 111. Using these current indications, Control Circuit 106 generates control signal 123 with alternating high times and low times corresponding to Ton and Toff, respectively. In some embodiments, INV 109 may be used to invert control signal 123, such that a logic high level on control signal 123 enables Q 107 and disables Q 108, and vice versa for a logic low level. Control Circuit 106, in the illustrated embodiment, generates control signal 123 using one of two modes: a pulse width modulation (PWM) mode and a pulse frequency modulation (PFM) mode. The selection of which mode to use is determined by an amount of current being drawn by Load 105. When the current drawn by Load 105 is below a threshold level, Control Circuit 106 uses PFM mode to generate control signal 123. Otherwise, when the current to Load 105 is above the threshold, PWM is used. Further details regarding operation in PFM and PWM modes will be provided below.

It is noted that any suitable current measurement circuits may be used to implement Current Devices 110 and 111. For example, voltage levels on each side of a series resistor may be measured and used to calculate current. In other embodiments, a second inductor, magnetically coupled to L 103 may be used to mirror current through L 103. In some embodiments, current through Q 108 may be determined by measuring Vout 124 if the on resistance of Q 108 is known (i.e., $R_{DSON}$ of Q 108).

It is also noted that the voltage converter illustrated in FIG. 1 is merely an example. Only components necessary to demonstrate the disclosed concepts are shown in FIG. 1. Additional and/or different components may be included in other embodiments. Furthermore, different configurations of components may be possible dependent upon the specific application for which the voltage converter is intended.

Figure 2:
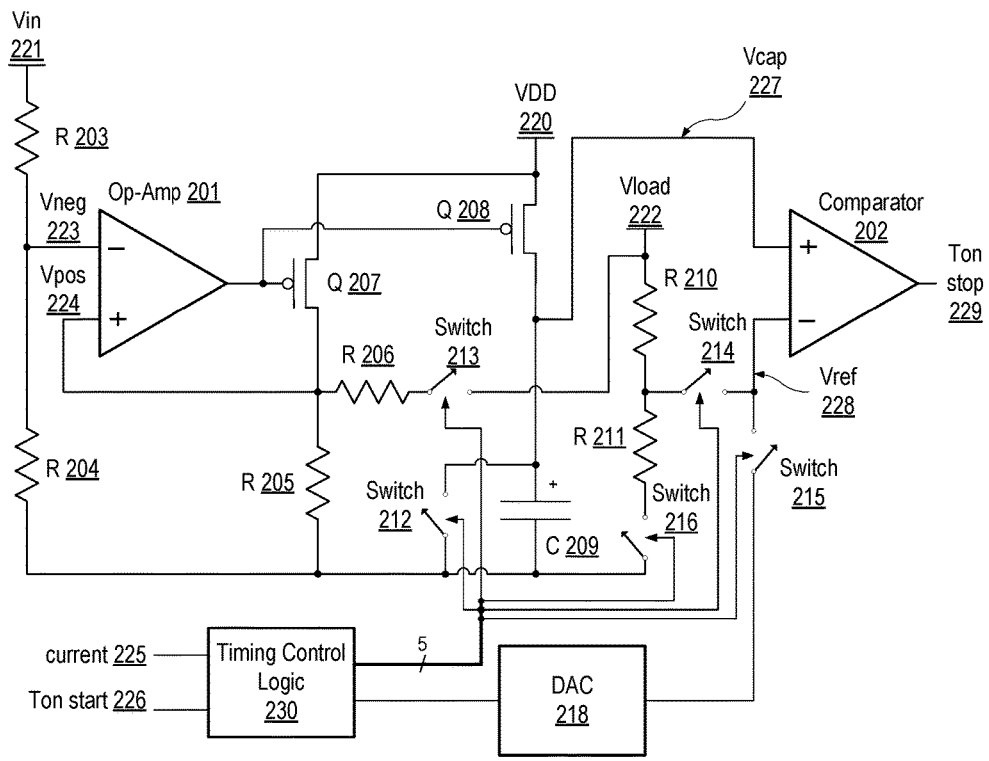
FIG. 2 shows a block diagram of an embodiment of a configurable timing circuit for a voltage converter.

Turning to FIG. 2, a block diagram of an embodiment of a configurable timing circuit for a voltage converter is illustrated. In some embodiments, Timing Circuit 200 may correspond to at least a portion of Control Circuit 106 in FIG. 1. Control Circuit 200 includes Operational Amplifier Circuit (Op-Amp) 201, and Comparison Circuit (Comparator) 202. Resistors (R) 203, 204, 205, and 206 are coupled to inputs of Op-Amp 201. Transistors (Q) 207 and 208 are coupled to an output of Op-Amp 201. Switch 212 is coupled to R 206 and R 210, and is controlled by a signal from Timing Control Logic 230. Switch 213 is coupled to Capacitor (C) 209 and to an input of Comparator 202. Switch 214 is coupled to R 210, R 211 and another input of Comparator 202. Switch 215 is coupled to Digital-to-Analog Converter (DAC) 218 and to an input of Comparator 202. Switch 216 is coupled to R 211. Several signals are received as inputs, VDD 220, Vin 221, Vload 222, current 225, and Ton start 226. Comparator 202 generates output signal Ton stop signal 229. Internal signals Vcap 227 and Vref 228 are also included.

Timing Circuit 200, in the illustrated embodiment, is used to generate a signal denoting an end of a Ton time pulse. Timing Circuit 200 receives Ton start signal 226 which asserts upon a beginning of a Ton time period. Switch 212 is opened in response to receiving Ton start signal 226, at which point C 209 begins to charge, increasing a voltage level across C 209, and therefore a voltage level of Vcap 227 at the positive input of Comparator 202. When the voltage level of Vcap 227 is greater than a voltage level of Vref 228 at the negative input of Comparator 202, Ton stop signal 229 is asserted high, denoting an end of a given Ton time period.

Ton stop signal 229 de-asserts upon switch 212 being closed, after a subsequent Toff time period begins.

The rate at which C 209 charges is dependent upon a current through Q 208, which is, in turn, dependent upon a current through Q 207. Q 207 and Q 208 are arranged as a current mirror in which the current through Q 208 is proportionate to the current through Q 207. The proportion is determined by a relative sizing of Q 208 to Q 207. In some embodiments, Q 208 may conduct twice as much current as Q 207 for a given gate voltage level, while in other embodiments, the proportion may be programmable to provide adjustments to the charging rate of C 209. The amount of current through Q 207 depends on an output voltage of Op-Amp 201, the lower the output voltage, the more current flows though Q 207, and therefore through Q 208. The voltage level of the output of Op-Amp 201 is dependent on the difference between a voltage level of the positive input (Vpos 224) and a voltage level of the negative input (Vneg 223). R 203 and R 204 form a voltage divider such that the voltage level at the negative input (Vneg) is represented by Equation (1).

$$Vneg = Vin * \frac{R4}{R3 + R4} \quad (1)$$

The variable Vin corresponds to the voltage level of Vin 221, R3 is the resistance value of R 203, and R4 is the resistance value of R 204. If, for example, the resistance of R 203 is chosen to be three times the resistance of R 204. Then the voltage level of Vneg 223 equals one-fourth of the voltage level of Vin 221. The voltage level of Vpos 224 is dependent upon an operational mode of Timing Circuit 200. In addition, the voltage level of Vref 228 on the negative input of Comparator 202 is also dependent upon the operating mode.

Timing Circuit 200 generates Ton stop signal 229 in two operating modes, PWM and PFM mode. Timing Control Logic 230 receives current signal 225, which includes an indication of a current through an inductor, e.g., L 103 in FIG. 1, and uses this indication to select which operating mode to use. Timing Control Logic 230 may select PFM mode if the current indication is below a first threshold and select PWM mode if the indication is above a second threshold. In some embodiments, the first and second thresholds may be the same, while in other embodiments, the second threshold may be greater than the first threshold to include some hysteresis in the selection process. The current indication may be monitored continuously or periodically in various embodiments.

Switches 213, 214, 215, and 216 are set by Timing Control Logic 230 dependent upon the selected operating mode. Switches 213, 214, 215, and 216 may, in some embodiments, be implemented as transistors, such as, for example, MOSFETs. In other embodiments, Switches 213, 214, 215, and 216 may be implemented as electromechanical devices, such as, for example, relays. When PWM mode is selected, Switch 213 and Switch 215 are opened, and Switch 214 and Switch 216 are closed. The opposite occurs (Switches 213 and 215 are closed and Switches 214 and 216 are opened) when PFM mode is selected. Additional details of the operation of Timing Circuit 200 in each operating mode are disclosed below.

It is noted that any one of various design styles may be used for Comparators 201 and 202. For example, compare unit 204 may employ a sense amplifier, an analog comparator, or any other suitable circuit for comparing the voltage levels of two or more signals. Compare unit 204 may initiate a comparison upon receiving an enable signal from control logic 205.

It is also noted that the system illustrated in FIG. 2 is merely an example. In other embodiments, different functional blocks and different configurations of functions blocks are possible dependent upon the specific application for which the system is intended.

Figure 3:
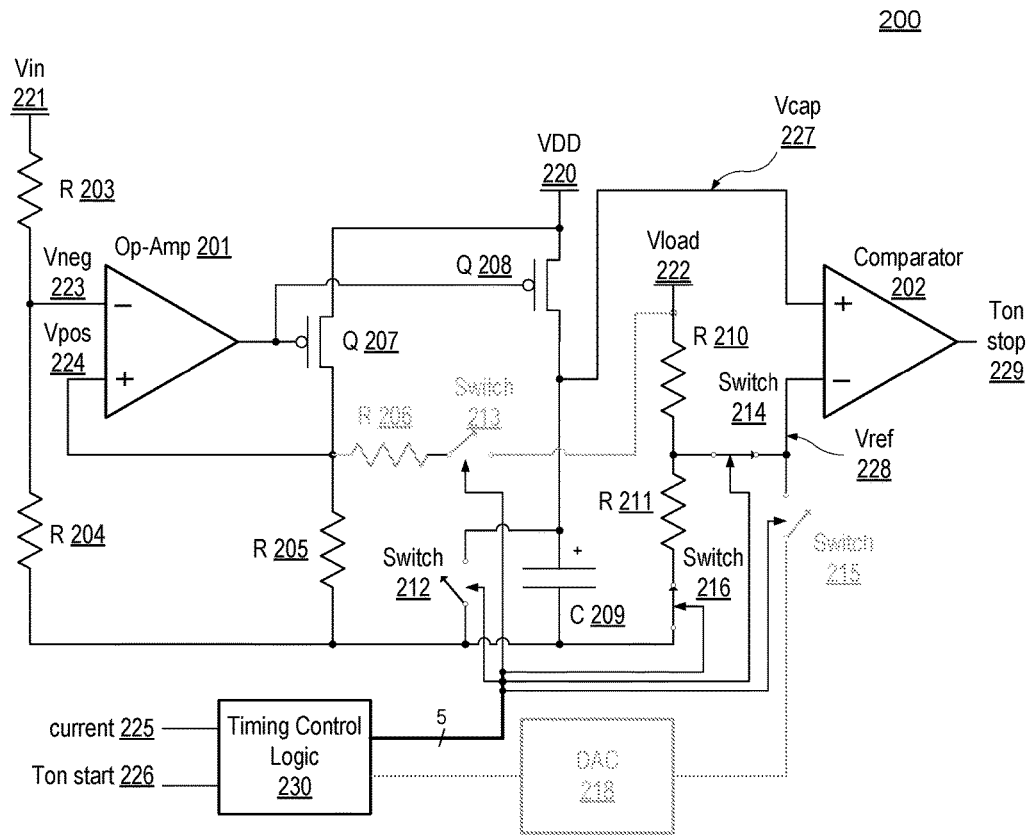
FIG. 3 illustrates the embodiment of FIG. 2 in a first operational mode.

Moving to FIG. 3, an embodiment of Timing Circuit 200 in FIG. 2 is illustrated in a first operational mode. The first operational mode may correspond to a PWM mode. Switches 213 and 215 are open and Switches 214 and 216 are closed in response to PWM being selected. R 206 and DAC 218 are shown in gray to distinguish that these components are decoupled due to the states of Switches 213 and 215.

Before a Ton time period starts, Switch 212 may be closed, causing the positive input of Comparator 202 to be coupled to the ground signal and therefore resulting in the voltage level of Vcap 227 to be less than the voltage level of Vref 228. Ton stop signal 229 is, therefore, at a logic low value. Upon Ton start signal 226 being asserted, Switch 212 is opened and C 209 begins to charge. If the current mirror including Q 207 and Q 208 is set for a current proportion of 2-to-1, then the voltage level of C 209 (Vcap) at a given time "t" may be represented by equation (2).

$$Vcap(t) = \frac{2I * t}{C} \quad (2)$$

In equation (2), the variable "I" is the current through R 205, which is equal to Vin 121/(4*R 205). The variable "C" corresponds to the capacitance value of C 209. Substituting the current into equation (2), produces equation (3).

$$Vcap(t) = \frac{Vin * t}{2 * R5 * C} \quad (3)$$

The variable "R5" is the resistance of R 205. Ton stop signal 229 transitions from a logic low to a logic high value when the voltage level of Vcap 227 equals the voltage level of Vref 228. In PWM mode, the voltage level of Vref 228 is given by equation (4).

$$Vref = Vload * \frac{R11}{R10 + R11} \quad (4)$$

In equation (4), "Vref" corresponds to the voltage level of Vref 228, "Vload" corresponds to the voltage level of Vload 222, "R10" is the resistance value of R 210 and "R11" is the resistance value of R 211. If the resistance of R 210 is chosen to be three times the resistance of R 211, then the voltage level of Vref 228 is one-fourth of the voltage level of Vout. Substituting this into equation (3) may determine a value of Ton, i.e., a time at which Ton stop signal 229 asserts.

$$Vcap(Ton) = \frac{Vin * Ton}{2 * R5 * C} = Vref = Vload/4 \quad (5)$$

$$\frac{Vin * Ton}{2 * R5 * C} = Vload/4 \quad (6)$$

$$Ton = \frac{Vload}{Vin} * \frac{R5 * C}{2} \quad (7)$$

As shown by equation (7), Ton stop signal 229 asserts dependent upon the ratio of the voltage levels of Vload 222 to Vin 221 times a constant determined by the resistance of R 205 and the Capacitance of C 209. A desired Ton time period may be selected by choosing the values of R 205 and C 209 for expected voltage levels of Vin 221 and Vload 222.

FIG. 3 is merely one example used to demonstrate the disclosed concepts. In other embodiments, component values for resistors and transistors may differ per requirements for the particular embodiment. The equations shown may be simplified to ignore various parasitic parameters of a technology in which the timing circuit is implemented.

Figure 4:
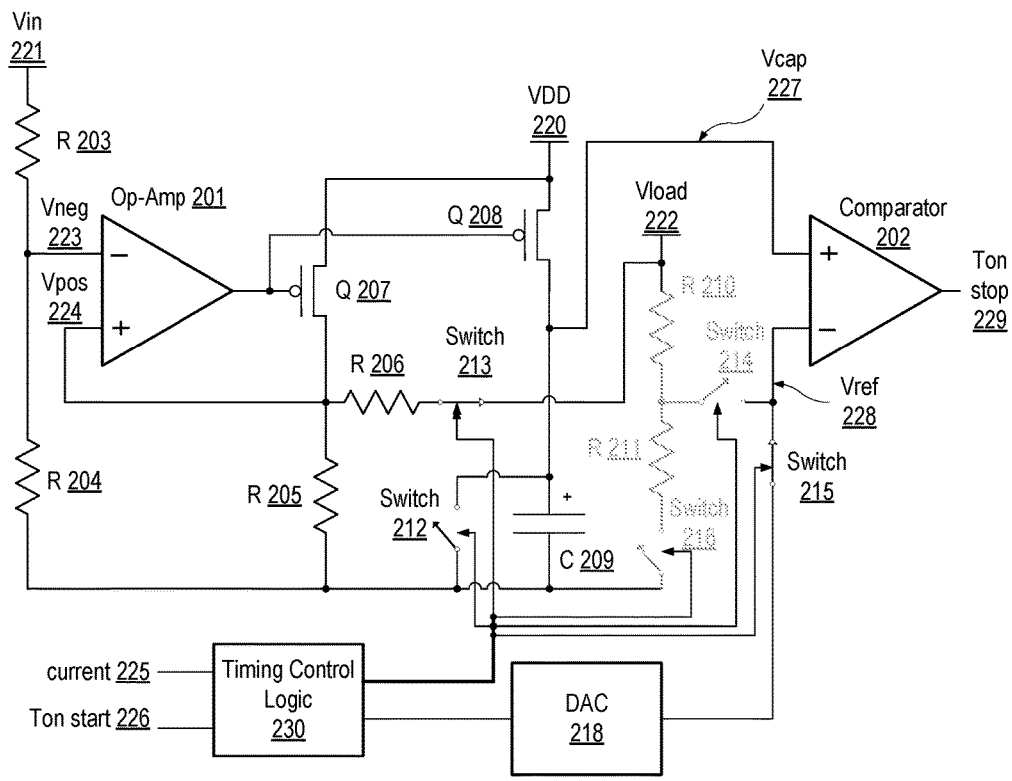
FIG. 4 illustrates the embodiment of FIG. 2 in a second operational mode.

Turning now to FIG. 4, another embodiment of Timing Circuit 200 in FIG. 2 is illustrated in a second operational mode. The second operational mode may correspond to a PFM mode. In the illustrated embodiment, PFM mode is selected, and, accordingly, Switches 213 and 215 are closed and Switches 214 and 216 are open. R 210 and R 211 are shown in gray to distinguish that these components are decoupled due to the state of Switches 214 and 216.

Similar to the description for FIG. 3, Switch 212 may be closed before a Ton time period starts. The voltage level of Vcap 227 is, therefore, less than the voltage level of Vref 228, and Ton stop signal 229 is at a logic low value. Upon Ton start signal 226 being asserted, Switch 212 is opened and C 209 begins to charge. Assuming that the current mirror including Q 207 and Q 208 is set for a current proportion of 2-to-1, then the charging rate of C 209 may be represented by equation (2) above. In PFM mode, the current (I) through R 205, is represented by a different equation than in PWM mode, as shown in equation (8).

$$I = \frac{Vin - Vload}{3 * R5} \quad (8)$$

Substituting equation (8) into equation (2), produces equation (9).

$$Vcap(t) = \frac{2t * (Vin - Vload)}{3 * R5 * C} \quad (9)$$

As before, R5 is the resistance value of R 205 and C is the capacitance of C 209. Ton stop signal 229 asserts when the voltage level of Vcap 227 equals the voltage level of Vref 228. In PFM mode, the voltage level of Vref 228 is determined by settings of DAC 218. To determine the Ton time, equation 9 is set equal to Vref (i.e., voltage level of DAC 218) and solved for Ton, as shown in equations (10) and (11).

$$Vcap(Ton) = \frac{2t * (Vin - Vload)}{3 * R5 * C} = Vref \quad (10)$$

$$Ton = \frac{1.5 * R5 * C * Vref}{Vin - Vload} \quad (11)$$

Equation 10 assumes the resistance of R 206 is three times the resistance of R 205 and that the resistance of R 203 is three times the resistance of R 204. The voltage level of DAC 218 (corresponding to the voltage level of Vref 228 while Switch 215 is closed) is set based on a desired "Ipeak." Ipeak is a maximum current limit through L 103 of FIG. 1. To determine a setting for DAC 218 for a given Ipeak, equation (12) may be used.

$$Vdac = \frac{L * Ipeak}{1.5 * R5 * C} \quad (12)$$

In equation (12), "Vdac" corresponds to the voltage level of the output of DAC 218, and "L" is the inductance value of L 103. In PFM mode, a desired Ipeak is chosen, for example, by software running in Control Circuit 106 of FIG. 1, in an SoC or processor included in Load 105, hardcoded in in Timing Control Logic 230, or the like. The values for the resistance of R 205 and the capacitance of C 209 may be determined for a desired Ton for PWM mode and Vin 221 and Vload 222, as well as the inductance of L 103, may be set by requirements for Load 105 and/or other system requirements. The desired Ipeak may, in some embodiments, be the primary variable for setting Ton in PFM mode.

It is noted that FIG. 4 is an example for demonstrating concepts disclosed herein. The presented equations may be simplified for clarity by ignoring various parasitic parameters of a technology in which Timing Circuit 200 is implemented. FIG. 4 merely presents a functional representation of Timing Circuit 200 and is not intended to portray a physical layout of the components.

Figure 5:
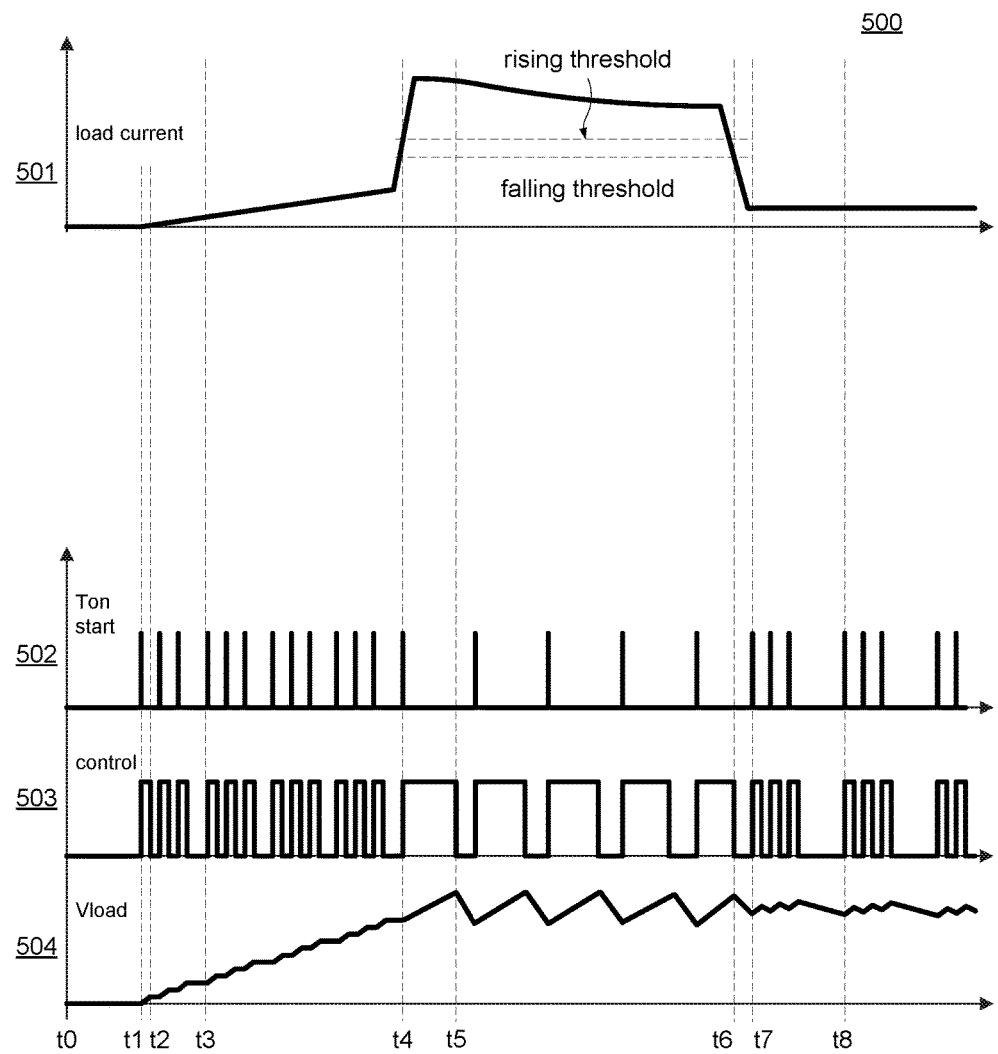
FIG. 5 shows a chart depicting waveforms for an embodiment of a voltage converter.

Moving now to FIG. 5, a chart depicting waveforms for an embodiment of a voltage converter is shown. Chart 500 in FIG. 5 shows several waveforms associated with operation of a voltage converter, such as, for example, Voltage Converter 100 in FIG. 1. Waveform 501 depicts current (y-axis) of a load, such as, e.g., Load 105, versus time (x-axis). Waveforms 502 through 504 depict voltages (y-axis) versus time (x-axis) for three different signals, including Ton start 502, control signal 503 (corresponding to control signal 123), and Vload 504 (corresponding to Vload 122).

In the illustrated embodiment, at time t0, Voltage Converter 100 may be disabled. The current into Load 105 is zero and Voltage Converter 100 may be inactive. The system of Voltage Converter 100 may be in a power down state or a reduced power state. At time t1, Voltage Converter 100 is activated and Control Circuit 106 selects PFM mode as a default operational mode upon a power-on event. Selection of PFM mode may allow for a "soft start" for Voltage Converter 100 and circuits in Load 105. A "soft start" may provide a gradual increase in the voltage level of Vload 504 which may avoid issues that may occur with a rapid rise in Vload 504, such as, for example, in-rush current into Load 105 that can cause, in some embodiments, short or long term reliability concerns. Control Circuit 106 asserts control signal 503 in response to an assertion of Ton start signal 502, as well as enabling a Ton timing circuit, such as, for example, Timing Circuit 200 in FIG. 2. Driver Circuit 102 enables Q 107 in response to the assertion of control signal 503, and Load 105 begins to draw current as Vload 504 begins to rise.

At time t2, Timing Circuit 200, operating in PFM mode, asserts an indication that a first Ton time period has expired, and in response, control signal 503 is de-asserted by Control Circuit 106. Driver Circuit 102 disables Q 107 and enables Q 108 in response to the de-assertion of control signal 503. Vload 504 may cease rising while control signal 503 is low, and, in some embodiments, may start to decrease. While control signal 503 is low, Control Circuit 106 monitors current through L 103 using Current Device 110. Control Circuit 106 may assert Ton start 502 again dependent upon the measurements of Current Device 110, repeating the process for a predetermined number of pulses (referred to herein as a "pulse train"), such as, in the illustrated example, for three pulses. After the pulse train of three pulses, Control Circuit 106 may monitor one or more voltage levels, such as, for example Vload 504 and/or Vout 124 in FIG. 1.

At time t3, the monitored voltage levels reach threshold levels, and, in response, Control Circuit 106 initiates another pulse train of three pulses. While Voltage Converter 100 is in PFM mode from time t1 through time t3, the process repeats, with Control Circuit 106 initiating pulse trains dependent on the monitored voltage levels. Operation in PFM mode will be disclosed in further detail below.

Just before time t4, Vload 504 reaches a target voltage level. In one embodiment, current demand by Load 105 increases in response to Vload 504 reaching the target voltage. At time t4, load current 501 reaches a rising threshold level. In response to load current reaching the rising threshold level, Control Circuit 106 switches Voltage Converter 100 into PWM mode to meet the rising current demand from Load 105. Ton start 502 is asserted and, in response, control signal 503 is asserted. Driver Circuit 102 disables Q 108 and enables Q 107. Control Circuit 106 enables Timing Circuit 200 in PWM mode to indicate when the current Ton time period should end. The voltage level of Vload 504 may rise during the Ton time period as L 103 is coupled to Power Source 101 via Q 107.

At time t5, Timing Circuit 200 asserts an indication to end the current Ton time period. Control Circuit 106 de-asserts control signal 503. Driver Circuit 102 enables Q 108 and disables Q 107. Timing Circuit 200 is reset until a next transition occurs on Ton start 502. Control Circuit 106 monitors currents at Current Devices 110 and 111 to determine when to assert Ton start again. The voltage level of Vload 504 may fall during the Toff time period as L 103 is coupled to the ground signal via Q 108. This process repeats while Voltage Converter 100 is in PWM mode. Additional details of PWM mode will be presented below.

At time t6, load current 501 drops below a falling threshold. In response, Control Circuit 106 switches Voltage Converter 100 back into PFM mode. In some embodiments, Voltage Converter 100 may operate more efficiently in PFM mode when load current 501 is low. At time t7, Control Circuit 106 initiates a pulse train of three pulses on control signal 503. As previously disclosed Control Circuit 106 monitors the one or more voltage levels and initiates another pulse train when the monitored voltage levels reach the threshold levels at time t8. It is noted that the time between pulse trains may vary dependent upon the load current 501. The process repeats while Voltage Converter 100 remains in PFM mode.

It is noted that FIG. 5 is merely an example of waveforms that may result from the example embodiments as presented in this disclosure. The waveforms are simplified to provide clear descriptions of the disclosed concepts. Shapes of the waveforms may also be exaggerated for emphasis. In other embodiments, the waveforms may appear different due to various influences such as technology choices for building the circuits, actual circuit design and layout, ambient noise in the environment, choice of power supplies, etc.

Figure 6:
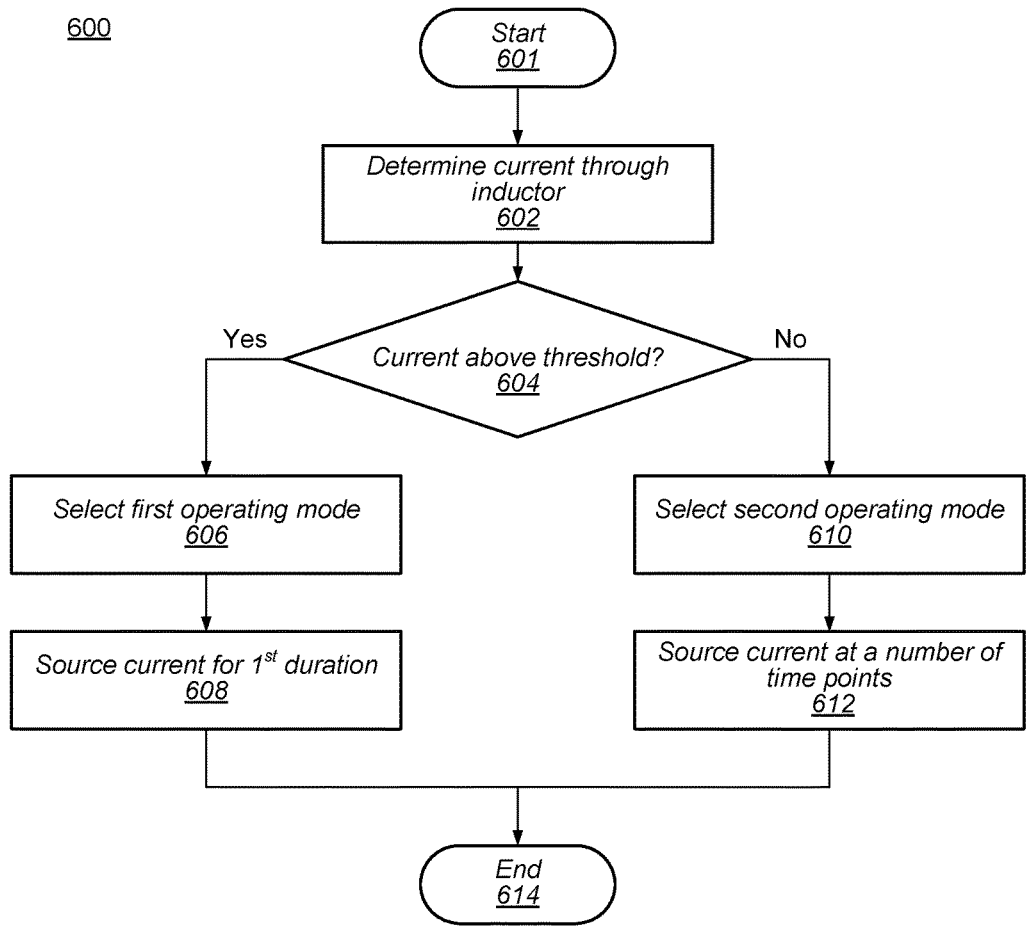
FIG. 6 illustrates a flow diagram for an embodiment of a method for operating a voltage converter.

Turning to FIG. 6, a flow diagram for an embodiment of a method for operating a voltage converter is illustrated. Method 600 may be applied to a voltage converter such as, for example, Voltage Converter 100. Referring collectively to Voltage Converter 100 in FIG. 1, and the flow diagram in FIG. 6, the method begins in block 601.

Current through an inductor is determined (block 602). In one embodiment, Control Circuit 106 uses Current Device 110 to determine an amount of current flowing through L 103. In various embodiments, the current may be continuously or periodically monitored. In embodiments utilizing periodic monitoring of Current Device 110, the time between each measurement may be determined by an expected maximum rate of change of the current.

Further operations of Method 600 may depend on the measured current (block 604). The measured current, in the one embodiment, is compared to a threshold value. If the measured current is above the threshold, then the method moves to block 606 to select a first operating mode (e.g., PWM mode). Otherwise, the method moves to block 610 to select a second operating mode (e.g., PFM mode). In some embodiments, more than one threshold may be used. For example, a first threshold may be used if Voltage Converter 100 is currently in PFM mode and a second, lower threshold if Voltage Converter 100 is currently in PWM mode. Adding such a hysteresis may prevent Voltage Converter 100 from toggling back and forth between the two operating modes if the current is near the threshold.

If the measured current is above the threshold, then the first operating mode is selected (block 606). The first operating mode, in the one embodiment, corresponds to PWM mode. The measured current being above the threshold may indicate that the current demand by Load 105 is high enough to use PWM mode to source the load current. Consequently, Control Circuit 106 selects PWM mode as the operational mode.

Current is sourced to the load for a first duration of time (block 608). In the example embodiment, Control Circuit 106 uses Timing Circuit 200 to indicate when the first duration of time, i.e., the Ton time period, expires. Control Circuit 106 asserts control signal 123 at the start of the Ton time period, thereby sourcing current to Load 105. Timing Circuit 200 is set for PWM mode, as shown in FIG. 3, and asserts Ton stop signal 229 after sufficient time has passed. Control Circuit 106 de-asserts control signal 123 in response to the assertion of Ton stop signal 229. The method ends in block 614.

If the measured current is below the threshold, then the second operating mode is selected (block 610). In the one embodiment, the second operating mode corresponds to PFM mode. The measured current being below the threshold may indicate that the current demand by Load 105 is low, and using PFM mode to source the load current may provide greater efficiency than using PWM mode. In response, Control Circuit 106 selects PFM mode as the operational mode.

Current is sourced to the load at a predetermined number of points in time (block 612). In PFM mode, a series of pulses (i.e., a pulse train) of control signal 123 are generated to source current to Load 105, without the sourced current exceeding a predetermined peak allowable current. The number of pulses in each pulse train may be determined during the design of Voltage Converter 100. Control Circuit 106 asserts control signal 123 and enables Timing Circuit 200 at the beginning of each pulse of the pulse train. Accordingly, Control Circuit 106 de-asserts control signal 123 each time Timing Circuit 200 asserts Ton stop. Method 600 ends in block 614.

It is noted that the method illustrated in FIG. 6 is one example. In various other embodiments, additional operations may be included and some operations may be performed in parallel or in a different sequence.

Figure 7:
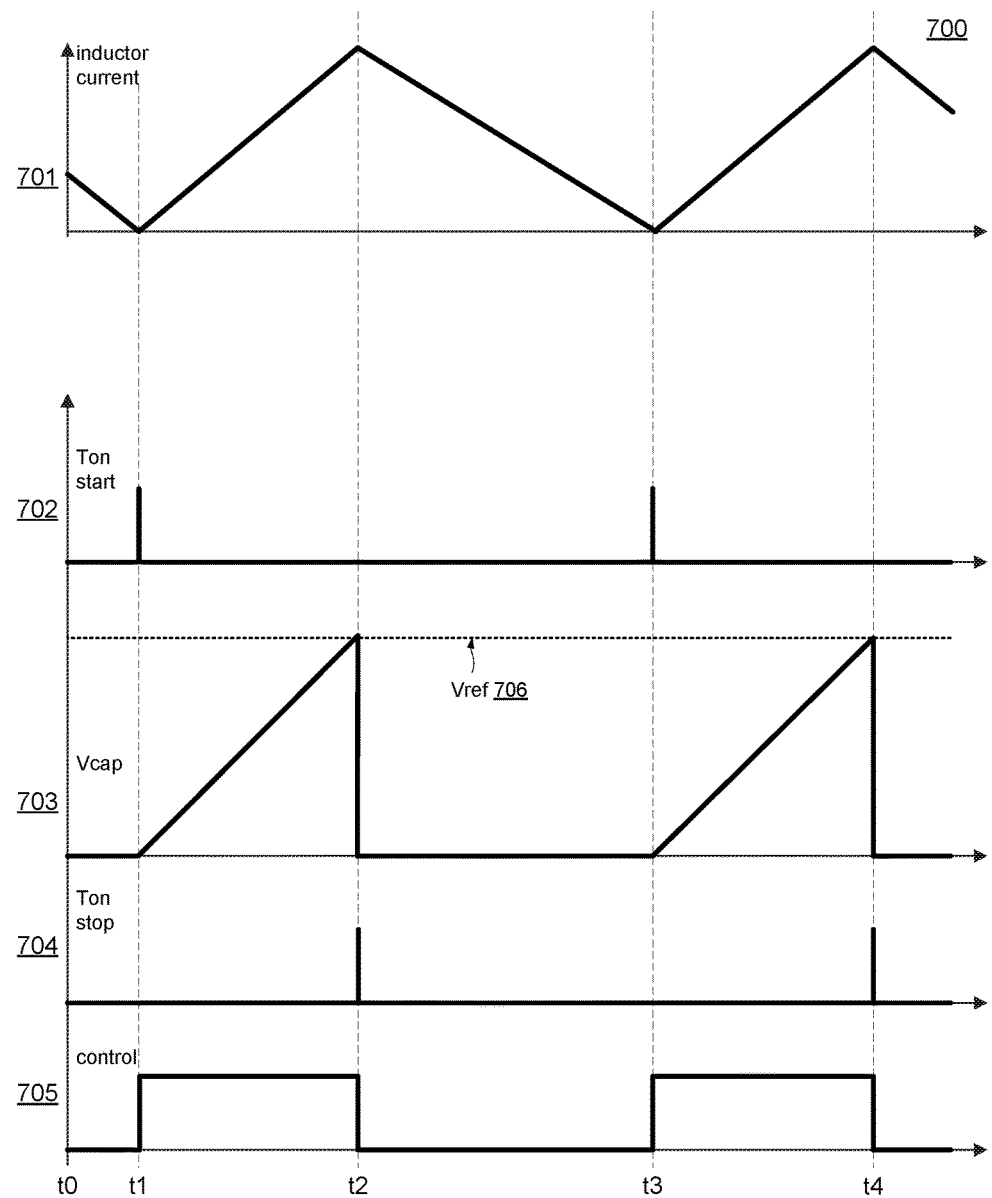
FIG. 7 depicts a chart illustrating waveforms for an embodiment of a voltage converter operating in the first operational mode.

Moving to FIG. 7, a chart illustrating waveforms for an embodiment of a voltage converter operating in the first operational mode is shown. Chart 700 in FIG. 7 shows several waveforms associated with operation of a voltage converter, such as, for example, Voltage Converter 100 in FIG. 1. More specifically, Chart 700 may depict operation of Timing Circuit 200 operating in PWM mode, as shown in FIG. 3. Referring collectively to Voltage Converter 100 in FIG. 1 and Timing Circuit 200 in FIG. 3, Chart 700 includes waveforms 701 through 705. Waveform 701 depicts current (y-axis) of an inductor, such as may flow through L 103, over time (x-axis). Waveforms 702 through 705 depict voltages (y-axis) versus time (x-axis) for four different signals, including Ton start 702 (corresponding to Ton start signal 226), Vcap 703 (corresponding to Vcap 227), Ton stop 704 (corresponding to Ton stop signal 229), and control signal 705 (corresponding to control signal 123). A reference voltage signal, Vref 706 (corresponding to Vref 228), is shown with Vcap 703.

At time t0, inductor current 701 is falling while Driver Circuit 102 has Q 108 enabled and Q 107 disabled. Signals Ton start 702, Vcap 703, Ton stop 704, and control 705 are all in a low state. Control Circuit 106 monitors current at Current Device 111 as inductor current 701 is falling. In some embodiments, Control Circuit 106 monitors Current Device 111 to detect the presence of a valley current. A "valley current" occurs when current through a circuit element reaches a minimum level between two points of higher current.

Control Circuit 106, at time t1, detects a valley current, and, in response, asserts Ton start signal 702. Timing Control Logic 230 in Timing Circuit 200 detects the assertion of Ton start signal 702 and opens switch 213 causing C 209 to begin charging and, therefore, the voltage level of Vcap 703 to begin rising. Control Circuit 106 also asserts control signal 705 in response to the assertion of Ton start 702. The assertion of control signal 705 causes Driver Circuit 102 to enable Q 107 and disable Q 108 causing, in turn, inductor current 701 to increase.

In the illustrated embodiment, at time t2, the voltage level of Vcap 703 equals the voltage level of Vref 706. In PWM mode, the voltage level of Vref 706 is dependent on Vload 222 and determined by the relative values of R 210 and R 211. In some embodiments, the resistance of R 210 may be three times the resistance of R 211, resulting in the voltage level of Vref 706 being one-fourth of the voltage level of Vload 222. In response to the voltage level of Vcap 703 reaching Vref 706, Comparator 202 asserts Ton stop signal 704. Control Circuit 106 de-asserts control signal 705 in response to the assertion of Ton stop signal 704, thereby causing Driver Circuit 102 to disable Q 107 and enable Q 108, in turn resulting in inductor current 701 beginning to decrease. Control Circuit 106 again monitors Current Device 111 to detect the presence of a valley current. Additionally, Timing Control Logic 230 closes Switch 213, coupling Vcap 703 to the ground signal.

At time t3, Control Circuit 106 detects a valley current and again asserts Ton start 702. The described process repeats with Q 107 causing inductor current 701 to increase and Timing Circuit 200 to measure another Ton time period. At time t4, the voltage level of Vcap 703 reaches Vref 706, resulting in another assertion of Ton stop 704 and the corresponding end to another Ton time period.

It is noted that FIG. 7 is an example of waveforms associated with the example embodiments presented herein. As described in regards to FIG. 5 above, the waveforms are simplified to provide clear descriptions of the disclosed embodiments. In various embodiments, the waveforms may be shaped differently due to various parameters and conditions of the components and environment associated with the circuits.

Figure 8:
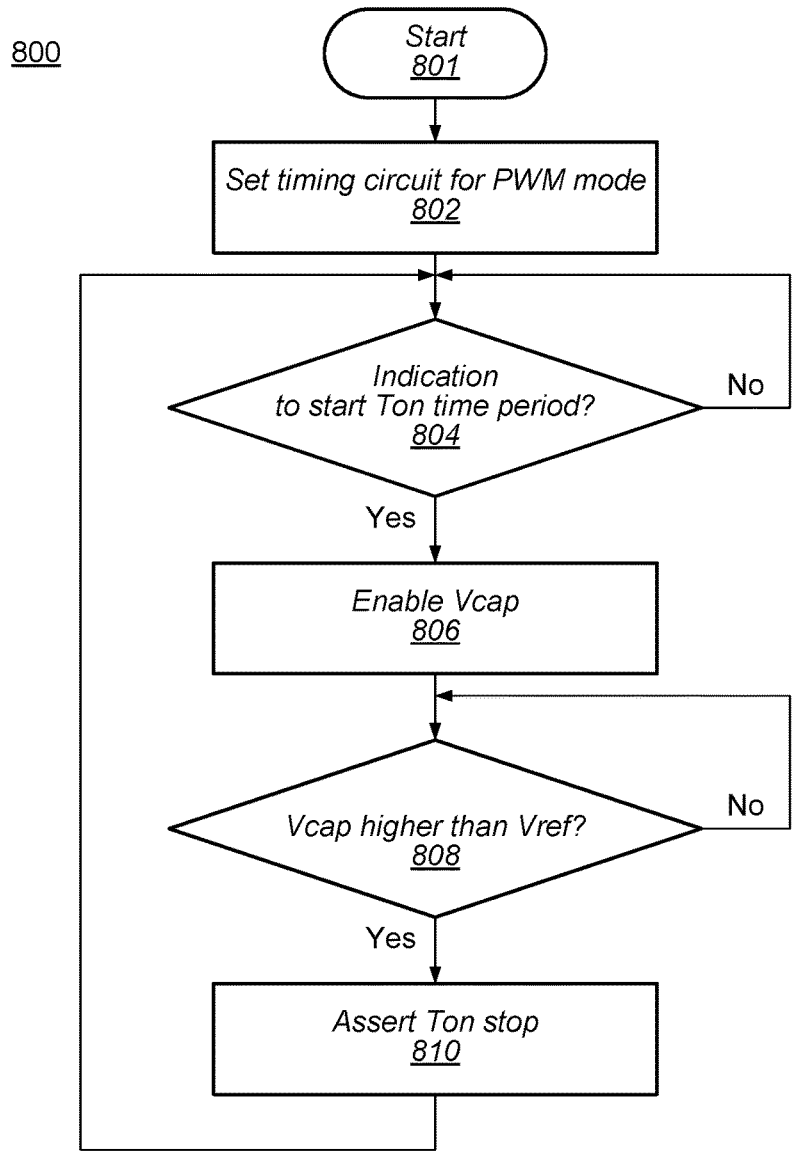
FIG. 8 shows a flow diagram for an embodiment of a method for operating a voltage converter in the first operational mode.

Proceeding to FIG. 8, a flow diagram for an embodiment of a method for operating a voltage converter in the first operational mode is illustrated. Method 800 may be applied to a voltage converter such as, for example, Voltage Converter 100 and may correspond to block 608 of Method 600 in FIG. 6. Additionally, Method 800 may apply to a timing circuit, such as Timing Circuit 200 illustrated in FIG. 3. Referring collectively to FIG. 1, FIG. 3 and the flow diagram in FIG. 8, the method begins in block 801 with Voltage Converter 100 in a Toff state.

The timing circuit is set for PWM mode (block 802). In the illustrated embodiment, Timing Circuit 200, based on current signal 225, selects the PWM mode of operation and, in response, closes Switches 214 and 216, and opens Switches 213 and 215. Switch 212 is closed until a Ton time period begins. The settings for Switches 214-216 cause the voltage level of Vref 228 to be proportionate to the voltage level of Vload 222.

Further operations of Method 800 may depend on receiving an indication to start a Ton time period (block 804). In some embodiments, Timing Control Logic 230 may monitor current signal 225 and compare the monitored current to a threshold value. In the illustrated embodiment, Timing Circuit 200 receives Ton start signal 226 from other logic in Control Circuit 106 to indicate a start to a Ton time period. If Ton start signal 226 is not asserted, then the method remains in block 804 until it is asserted. Otherwise, the method moves to block 806 to begin a Ton time period.

A voltage level across a capacitor is allowed to increase (block 806). In the illustrated embodiment, Timing Control Logic 230 opens Switch 212 in response to the assertion of Ton start signal 226, thereby allowing C 209 to accumulate charge. As it accumulates charge, the voltage level across C 209 (Vcap 227) increases, which, in turn, increases the voltage level at the positive input terminal of Comparator 202. The rate at which C 209 accumulates charge is dependent upon the capacitance of C 209. The capacitance, therefore, may be selected to produce a desired rate of charge accumulation and, in turn, a desired rate of change of Vcap 227.

Continuing operations of the method may depend upon the voltage level across the capacitor (block 808). The voltage level of Vcap 227 is compared to a reference voltage (Vref 228) by Comparator 202. The voltage level of Vref 228 is determined by the voltage level of Vload 222 and the relative resistances of R 210 and R 211. In the illustrated embodiment, the resistance of R 210 is three times the resistance of R 211, resulting in the voltage level of Vref 228 being one-fourth the voltage level of Vload 222. In other embodiments, however, the resistance values of R 210 and R 211 may be selected to produce any suitable voltage level on Vref 228. The Ton time period is determined by the amount of time for Vcap 227 to charge from an initial voltage level when Switch 212 is opened to the point when Vcap 227 exceeds Vref 228. If the level of Vcap 227 exceeds the level of Vref 228, then the method moves to block 810 to assert Ton stop signal 229. Otherwise, the method remains in block 808.

It is noted that the above description states that Comparator 202 asserts its output when the voltage level of Vcap 227 at the positive input terminal exceeds the voltage level of Vref 228 at the negative input terminal. In other embodiments, Comparator 202 may assert Ton stop signal 229 when the voltage levels of the two input terminals are equal in addition to when the positive input is higher than the negative input. It is contemplated that selection of either embodiment is a mere design preference.

The Ton stop signal is asserted (block 810). In the illustrated embodiment, once the level of Vcap 227 exceeds the level of Vref 228, Comparator 202 asserts Ton stop signal 229. The assertion of Ton stop signal 229 corresponds to the end of a current Ton time period. In response to the assertion of Ton stop signal 229, Control Circuit 106 de-asserts Control signal 123. In addition, Timing Control Logic 230 closes switch 212 in response to the assertion of Ton stop signal 229, resulting in Vcap 227 being shorted to a ground signal and thereby falling to a voltage level below Vref 228. Ton stop signal 229, therefore, may be asserted as a short pulse. The method returns to block 804 to wait for a next assertion of Ton start signal 226.

It is noted that Method 800 in FIG. 8 is an example embodiment. Variations of the example embodiment are contemplated and may include additional operations. In other embodiments, some operations may be performed in parallel or in a different sequence.

Figure 9:
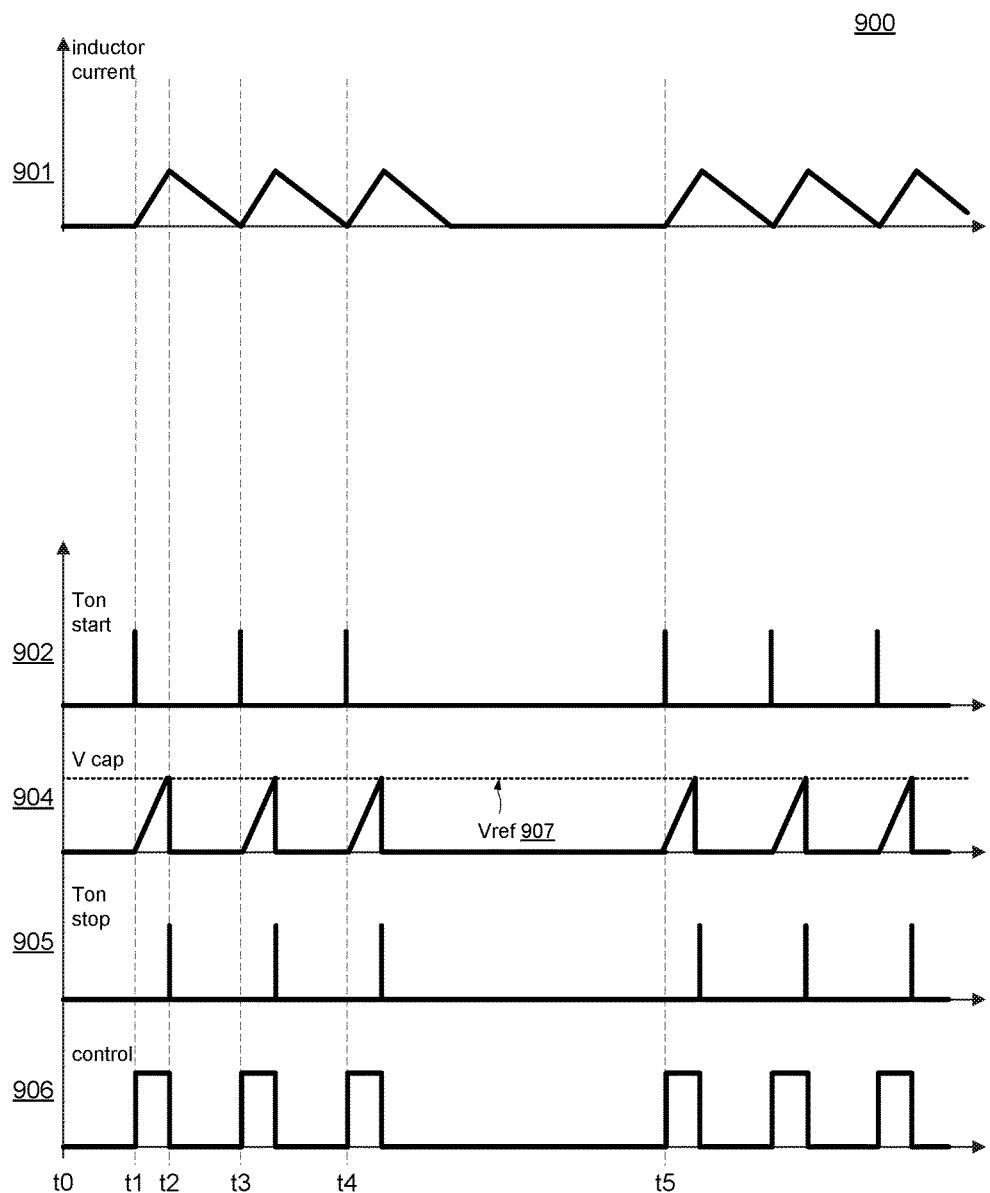
FIG. 9 presents a chart depicting waveforms for an embodiment of a voltage converter operating in the second operational mode.

Moving now to FIG. 9, a chart illustrating waveforms for an embodiment of a voltage converter operating in the second operational mode is shown. Chart 900 shows several waveforms associated with operation of a voltage converter, such as, for example, Voltage Converter 100 in FIG. 1. More specifically, Chart 900 may depict operation of Timing Circuit 200 operating in PFM mode, as shown in FIG. 4. Referring collectively to Voltage Converter 100 in FIG. 1 and Timing Circuit 200 in FIG. 4, Chart 900 includes waveforms 901 through 906. Waveform 901 depicts current (y-axis) of an inductor, such as may flow through L 103, over time (x-axis). Waveforms 902 through 906 depict voltages (y-axis) versus time (x-axis) for five different signals, including Ton start 902, Vcap 904 (corresponding to Vcap 227), Ton stop 905 (corresponding to Ton stop signal 229), and control signal 906 (corresponding to control signal 123). A reference voltage signal, Vref 907 (corresponding to Vref 228), is shown with Vcap 904.

In the illustrated embodiment, Voltage Converter 100 is operating in PFM mode and is in a Toff state at time t0. Inductor current 901 is zero while Driver Circuit 102 has Q 108 enabled and Q 107 disabled. Signals Ton start 902, Vcap 904, Ton stop 905, and control 906 are all in a low state. Control Circuit 106 monitors Vload 122 during the time between t0 and t1. At time t1, Control Circuit 106 detects that the voltage level of Vload 122 drops below a threshold voltage level, and in response, asserts Ton start signal 902. The assertion of Ton start signal 902 causes control signal 906 to assert. Timing Control Logic 230, in response to the assertion of Ton start signal 902, opens Switch 212. In response to Switch 212 opening, charge begins to accumulate on C 209 and the voltage level of Vcap 904 begins to increase. In PFM mode, Switches 214 and 216 are open and Switches 213 and 215 are closed, resulting in the output of DAC 218 being used to set a voltage level of Vref 907. Comparator 202 compares the voltage level of Vcap 904 to the voltage level set in DAC 218, i.e., Vref 907.

At time t2, the level of Vcap 904 reaches the voltage level of Vref 907. Comparator 202 asserts Ton stop signal 905 in response. Control Circuit 106, in response to the assertion of Ton stop 905 de-asserts control signal 906 and closes Switch 212. It is noted that after entering PFM mode, Timing Control Logic 230 sets a value of DAC 218 to limit the peak current through L 103, by limiting how high the voltage level of Vcap 227 may reach. While control signal 906 is low, Control Circuit 106 monitors current through L 103 using Current Device 110. It is also noted that the current through L 103 may not equal current through Load 105 since, while control signal 906 is low, the current through load 105 may be pulled from C 104 rather than through L 103. In various embodiments, Control Circuit 106 may monitor Current Device 110 continuously or periodically.

In the illustrated embodiment, at time t3, Control Circuit 106 asserts Ton start signal 902 again. In response to the assertion of Ton start signal 902, Control Circuit 106 asserts control signal 906 and opens Switch 212, thereby generating another pulse of control signal 906 as just described. The pulse is ended once the voltage level of Vcap 904 reaches the voltage level of Vref 907, as set by DAC 218. One more pulse of control signal 906 is generated in response to a next assertion of Ton start signal 902.

In the example of Chart 900, these three pulses of control signal 906 are referred to as a pulse train, as described above. The number of pulses included in each pulse train may be predetermined by the design of Voltage Converter 100. In the present example, each pulse train includes three pulses of control signal 906, of which, the pulse beginning at time t4 is the final pulse of the first illustrated pulse train.

Between pulse trains, Control Circuit 106 monitors Vload 122 as described above during the time between t0 and t1. At time t5, Control Circuit 106 detects that the voltage level of Vload 122 drops below a threshold voltage level, and in response, asserts Ton start signal 902 to initiate a next pulse train. This process may repeat for as long as Voltage Converter 100 is in PFM mode.

It is noted that FIG. 9 is one example of waveforms associated with the disclosed embodiments. As described in regards to FIGS. 5 and 7 above, the waveforms are simplified for clarity. In various embodiments, the waveforms may have different shapes due to various parameters and conditions of the components and environment associated with the circuits.

Figure 10:
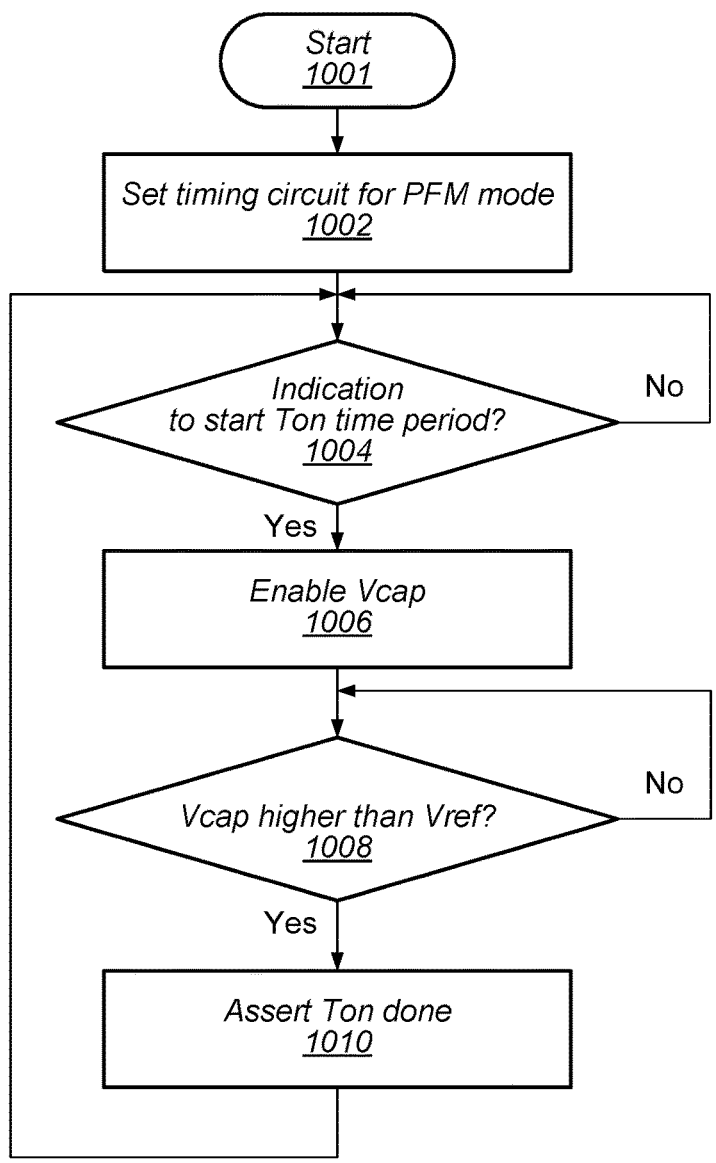
FIG. 10 illustrates a flow diagram for an embodiment of a method for operating a voltage converter in the second operational mode.

Proceeding to FIG. 10, a flow diagram for an embodiment of a method for operating a voltage converter in the second operational mode is illustrated. Method 1000 may correspond to block 612 of Method 600 in FIG. 6, and may be applied to a voltage converter such as, e.g., Voltage Converter 100. In additional, Method 1000 may apply to a timing circuit operating in PFM mode, such as Timing Circuit 200 illustrated in FIG. 4. Referring collectively to FIG. 1, FIG. 4 and the flow diagram in FIG. 10, the method begins in block 1001.

The timing circuit is set for PFM mode (block 1002). In the illustrated embodiment, Timing Circuit 200, based on current signal 225, selects the PFM mode of operation and, in response, opens Switches 214 and 216, and closes Switches 213 and 215. Switch 212 is closed until a Ton time period begins. The settings for Switches 214-216 cause the output of DAC 218 to generate a reference voltage, i.e., Vref 228. Timing Control Logic 230 determines an appropriate setting for the voltage level generated by DAC 218 based on a desired limit for Ipeak, as determined by equation 12 above. In various embodiments, DAC 218 may be set to predetermined output voltage level, or the voltage output level may be set dynamically to match present operating conditions, such as, for example, a battery voltage level or an operating temperature. In such embodiments, a processor included in Load 105 or Control Circuit 106 may set the voltage level of the output of DAC 218.

Further operations of Method 1000 may depend on receiving an indication to start a Ton time period (block 1004). In one embodiment, Timing Circuit 200 receives Ton start signal 226 from other logic in Control Circuit 106 to indicate a start to a Ton time period. If Ton start signal 226 is not asserted, then the method remains in block 804 until it is asserted. Otherwise, the method moves to block 806 to begin a Ton time period.

A voltage level across a capacitor is allowed to increase (block 1006). In the illustrated embodiment, Timing Control Logic 230 opens Switch 212 in response to the assertion of Ton start signal 226, thereby allowing C 209 to accumulate charge, and as a result, increasing the voltage level across C 209 (Vcap 227). The rate at which Vcap 227 increases is dependent upon the capacitance of C 209. The capacitance, therefore, may be selected to produce a desired rate of charge accumulation and, in turn, a desired rate of change of the voltage level of Vcap 227.

Subsequent operations of the method may depend upon a comparison of the voltage level of the capacitor to the level of the reference voltage (block 1008). In the illustrated embodiment, Comparator 202 receives Vcap 227 at a positive input terminal and receives Vref 228 at a negative input terminal. The output of Comparator 202 is Ton stop signal 229, which indicates the end of a given Ton time period. The Ton time period is determined by the time taken for the voltage level of Vcap 227 to rise from an initial voltage level (e.g., zero volts) to the voltage level of Vref 228. As stated above, in PFM mode, the voltage level of Vref 228 corresponds to the output of DAC 218. If the voltage level of Vcap 227 is lower than the voltage level of Vref 228, then the method remains in block 1008. Otherwise, Method 1000 moves to block 1010 to assert Ton stop signal 229.

A Ton stop signal is asserted (block 1010). In response to determining that the level of Vcap 227 has reached the level of Vref 228, Comparator 202 asserts Ton stop signal 229 to indicate an end to the current Ton time period. Timing Control Logic 230 closes Switch 212, causing C 209 to discharge and, therefore, the voltage level of Vcap 227 to decrease to a starting voltage level for the next Ton time period. The method returns to block 1004 to wait for another assertion of Ton start signal 226.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
an inductor coupled to a load circuit;
a control circuit configured to select a first operating mode in response to a determination that a value of a current flowing through the inductor is greater than a threshold value, and to otherwise select a second operating mode; and
a driver circuit configured to source current to the load circuit through the inductor based on an assertion of a control signal received from the control circuit;
wherein the control circuit is further configured to:
in the first operating mode, assert the control signal for a first duration that is determined by charging a capacitor to a voltage level of a first reference voltage; and
in the second operating mode, assert the control signal at a number of time points, wherein at each time point the control signal is asserted for a second duration that is determined by charging the capacitor to a voltage level of a second reference voltage, wherein the second reference voltage is based on an allowable peak current flowing through the inductor.

2. The apparatus of claim 1, wherein the control circuit is further configured to:
discharge the capacitor in response to an end of the first duration in the first operating mode; and
discharge the capacitor in response to an end of the second duration in the second operating mode.

3. The apparatus of claim 1, wherein the control circuit is further configured to, in the first operating mode, set the voltage level of the first reference voltage based on a voltage level across the load circuit.

4. The apparatus of claim 1, further comprising a digital-to-analog converter (DAC), wherein the control circuit is further configured to, in the second operating mode, select an output of the DAC as the second reference voltage.

5. The apparatus of claim 4, wherein the control circuit is further configured to adjust the allowable peak current by adjusting a voltage level of the output of the DAC.

6. The apparatus of claim 4, wherein the control circuit is further configured to disable the DAC in the first operating mode.

7. The apparatus of claim 1, wherein the first operating mode corresponds to a pulse width modulation mode and the second operating mode corresponds to a pulse frequency modulation mode.

8. A method, comprising:
in response to determining that a value of a current flowing through an inductor is greater than a threshold value, selecting a first operating mode, and otherwise selecting a second operating mode;
in the first operating mode, sourcing current to a load circuit through the inductor for a first duration that is determined by charging a capacitor to a voltage level of a first reference voltage; and
in the second operating mode, sourcing current to the load circuit through the inductor at a number of time points, wherein at each time point the current is sourced for a second duration that is determined by charging the capacitor to a voltage level of a second reference voltage, wherein the second reference voltage is based on an allowable peak current flowing through the inductor.

9. The method of claim 8, further comprising:
discharging the capacitor in response to an end of the first duration in the first operating mode; and
discharging the capacitor in response to an end of the second duration in the second operating mode.

10. The method of claim 8, further comprising, in the first operating mode, setting the voltage level of the first reference voltage based on a voltage level across the load circuit.

11. The method of claim 8, further comprising, in the second operating mode, selecting an output of a digital-to-analog converter (DAC) as the second reference voltage.

12. The method of claim 11, further comprising adjusting the allowable peak current by adjusting the output of the DAC.

13. The method of claim 11, wherein the first operating mode the first operating mode corresponds to a pulse width modulation mode and the second operating mode corresponds to a pulse frequency modulation mode.

14. The method of claim 8, further comprising selecting the second operating mode in response to a power-on event.

15. A system, comprising:
a power supply configured to generate a first voltage level;
an inductor coupled to a load circuit;
a voltage converter configured to:
select a first operating mode in response to a determination that a value of a current flowing through the inductor is greater than a threshold value, and to otherwise select a second operating mode;
in the first operating mode, source current to the load circuit through the inductor for a first duration that is determined by charging a capacitor to a voltage level of a first reference voltage; and
in the second operating mode, source current to the load circuit through the inductor at a number of time points, wherein at each time point the current is sourced for a second duration that is determined by charging the capacitor to a voltage level of a second reference voltage, wherein the second reference voltage is based on an allowable peak current flowing through the inductor.

16. The system of claim 15, wherein the voltage converter is further configured to:
discharge the capacitor in response to an end of the first duration in the first operating mode; and
discharge the capacitor in response to an end of the second duration in the second operating mode.

17. The system of claim 15, wherein the voltage converter is further configured to, in the first operating mode, set the voltage level of the first reference voltage based on a voltage level across the load circuit.

18. The system of claim 15, wherein the voltage converter includes a digital-to-analog converter (DAC), and wherein the voltage converter is further configured to, in the second operating mode, select an output of the DAC as the second reference voltage.

19. The system of claim 18, wherein the voltage converter is further configured to adjust the allowable peak current by adjusting the output of the DAC.

20. The system of claim 18, wherein the first operating mode corresponds to a pulse width modulation mode and the second operating mode corresponds to a pulse frequency modulation mode.

* * * * *